US007562310B2

(12) United States Patent
Champion et al.

(10) Patent No.: US 7,562,310 B2
(45) Date of Patent: Jul. 14, 2009

(54) SLIDER CONTROL MOVABLE IN A TWO-DIMENSIONAL REGION FOR SIMULTANEOUSLY ADJUSTING VALUES OF MULTIPLE VARIABLES

(75) Inventors: David Frederick Champion, Durham, NC (US); Vincent Rocco Lanzolla, Clayton, NC (US); Timothy Andreas Meserth, Durham, NC (US); Mark E. Molander, Cary, NC (US); David Thomas Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 11/397,748

(22) Filed: Apr. 4, 2006

(65) Prior Publication Data

US 2007/0234236 A1  Oct. 4, 2007

(51) Int. Cl.
*G06F 3/048* (2006.01)
(52) U.S. Cl. ...................................... 715/833; 715/832
(58) Field of Classification Search ................ 715/833, 715/832
See application file for complete search history.

(56) References Cited

U.S. PATENT DOCUMENTS

| | | | | |
|---|---|---|---|---|
| 5,291,285 A | * | 3/1994 | Yokoyama et al. | 348/180 |
| 5,477,241 A | * | 12/1995 | Higgins et al. | 345/661 |
| 5,491,782 A | * | 2/1996 | King et al. | 715/833 |
| 5,615,347 A | * | 3/1997 | Davis et al. | 715/833 |
| 5,682,488 A | * | 10/1997 | Gleason et al. | 715/833 |
| 5,808,610 A | * | 9/1998 | Benson et al. | 715/788 |
| 5,986,657 A | * | 11/1999 | Berteig et al. | 715/792 |
| 6,012,044 A | * | 1/2000 | Maggioncalda et al. | 705/36 R |
| 6,080,925 A | * | 6/2000 | Rogers et al. | 84/485 R |
| 6,240,425 B1 | * | 5/2001 | Naughton | 707/104.1 |
| 6,384,591 B1 | * | 5/2002 | Estep et al. | 324/111 |
| 6,542,171 B1 | * | 4/2003 | Satou et al. | 715/833 |
| 7,117,450 B1 | * | 10/2006 | Chaudhri | 715/787 |
| 7,117,453 B2 | * | 10/2006 | Drucker et al. | 715/833 |
| 7,180,524 B1 | * | 2/2007 | Axelrod | 345/593 |
| 7,212,998 B1 | * | 5/2007 | Muller et al. | 705/36 R |
| 7,222,308 B2 | * | 5/2007 | Sauermann et al. | 715/833 |
| D567,806 S | * | 4/2008 | Viduya et al. | D14/223 |
| 7,376,469 B2 | * | 5/2008 | Eischeid et al. | 700/17 |
| 7,380,216 B2 | * | 5/2008 | Feig et al. | 715/786 |
| 2002/0118848 A1 | * | 8/2002 | Karpenstein | 381/119 |
| 2004/0021695 A1 | * | 2/2004 | Sauermann et al. | 345/786 |
| 2005/0108645 A1 | * | 5/2005 | Prentice et al. | 715/722 |

(Continued)

*Primary Examiner*—William L Bashore
*Assistant Examiner*—David Phantana-angkool
(74) *Attorney, Agent, or Firm*—Harrington & Smith, PC

(57) ABSTRACT

The invention concerns methods and apparatus for generating and controlling a slider control for simultaneously changing values of two variables. In the methods and apparatus of the invention a graph having two axes is displayed, wherein the axes correspond to first and second variables. The values of the first and second variables may be simultaneously adjusted using a slider control displayed in a two-dimensional region between the axes. As a user adjusts the slider control and changes values associated with the two variables, the methods of the present invention calculate the effects of the adjustment on a value of a third variable. A graphical component is then used to depict the updated value of the third variable. Additionally, curves corresponding to constant values, or ranges of values, of the third variable are displayed in the two-dimensional region to assist a user in selecting values for the first and second variables.

12 Claims, 13 Drawing Sheets

U.S. PATENT DOCUMENTS

| | | | |
|---|---|---|---|
| 2005/0246647 A1* | 11/2005 | Beam et al. | 715/747 |
| 2006/0236248 A1* | 10/2006 | Eischeid et al. | 715/751 |
| 2006/0294142 A1* | 12/2006 | Breedvelt-Schouten et al. | 707/104.1 |
| 2007/0143200 A1* | 6/2007 | Muller et al. | 705/36 R |

* cited by examiner

PRIOR ART

SLIDER CONTROL MOVABLE IN A TWO-DIMENSIONAL REGION FOR SIMULTANEOUSLY ADJUSTING VALUES OF MULTIPLE VARIABLES

TECHNICAL FIELD

The present invention generally concerns visual optimization tools for use in graphical user interfaces, and more particularly concerns a slider control for simultaneously adjusting values of two variables, wherein a graphical component shows the effect of the adjustment on the value of a third variable, the depiction of the effect on the value of the third variable helping a user to select a combination of values for the first and second variables.

BACKGROUND

Graphical user interfaces and associated controls are becoming more popular as means to set parameters for operations and processes. Slider controls are particularly popular to control processes. Most computer-literate people are familiar with using slider controls to set various computer-related parameters in computer-related processes such as, for example, display resolution; level of virus and firewall security (e.g., from "low" to "high") etc.

Such slider controls are particularly useful for those relatively unfamiliar with underlying processes because they provide a level of abstraction with which novice users can relate. The alternative to using a slider control to set levels of virus and firewall protection may be daunting. Typically, the slider control abstracts numerous individual settings which otherwise would have to be individually set. The most common way of making such selections is with check boxes. In a complex security application, the number of check boxes may comprise tens, or even hundreds, of individual settings. If details are not provided to assist a user in making selections, the user may be befuddled as to whether an individual setting increases, or decreases, the level of security. In addition, unless the user has a detailed understanding of interactions between various settings, combinations of settings that conflict with a desired level of protection may be selected.

As indicated previously, slider controls overcome these problems because they provide a level of abstraction. Although a user typically will have difficulty in determining whether any particular combination of check box selections are optimal, the user will have a much easier time determining that a particular slider control setting is optimal. This occurs because experts are mapping the slider control settings to combinations of check settings in a complex process. Experts understand intuitively how settings combine and interact, and thus are capable of mapping the combinations to slider control settings in terms of, for example, "low protection" or "high protection".

Thus, slider controls are particularly useful when a plurality of settings can be abstracted to a single range. Slider controls are less useful, though, when a user is interested in more than one abstract characterization of a process. An archetypal relationship immediately comes to mind, the trade-off between performance level, availability and cost. It is not unusual that there is a direct relationship between cost and the level of availability and performance selected in a complex process. Increasing levels of availability and performance often come at great expense. In such situations, conventional slider controls have been found ineffective. Two slider controls simply do not provide enough information as to whether an optimal combination of values has been selected for two parameters.

Accordingly, those skilled in the art desire improvements to slider controls that enable them to be used to more effectively select values for two or more operating parameters.

SUMMARY OF THE PREFERRED EMBODIMENTS

The foregoing problems and other problems are overcome, and other advantages are realized, in accordance with the following embodiments of the present invention.

A first embodiment of the invention comprises a signal-bearing medium tangibly embodying a program of machine-readable instructions executable by a digital processing apparatus of a computer system to perform operations for displaying and controlling an interactive graphical user interface, the operations comprising: displaying a graph having two axes corresponding to first and second variables in the interactive graphical user interface, wherein a two-dimensional region between the two axes specifies values the first and second variables may assume, and wherein a combination of values that the two variables assume determines a value of a third variable; displaying a slider control in the two-dimensional region; receiving a command moving the slider control within the two-dimensional region to a new position, wherein the movement of the slider control to a new position determines a new combination of values for the first and second variables; calculating a new value for the third variable based on the new combination of values for the first and second variables; and displaying a graphical component representing the new value for the third variable in the interactive graphical user interface.

A second embodiment of the invention comprises a method for displaying and controlling an interactive graphical user interface, the method comprising: displaying a graph having two axes corresponding to first and second variables in the interactive graphical user interface, wherein a two-dimensional region between the two axes specifies values the first and second variables may assume, and wherein a combination of values that the first and second variables assume determines a value of a third variable; displaying a discrete number of pre-determined combinations of values for the first and second variables in the two-dimensional region; displaying a slider control in the two-dimensional region; receiving a command moving the slider control toward a position of a particular one of the pre-determined combinations of values for the first and second variables in the two-dimensional region; determining that a trajectory of the slider control is toward the particular one of the pre-determined combinations of values for the first and second variables displayed in the two-dimensional region; snapping a graphical indicator to the position of the particular one of the pre-determined combinations of values for the first and second variables in the two-dimensional region indicating that the particular one of the pre-determined combinations of values for the first and second variables has been selected; determining a new value for the third variable based on the new combination of values for the first and second variables associated with the particular one of the pre-determined combinations of values for the first and second variable; and displaying a graphical component representing the new value of the third variable in the interactive graphical user interface.

A third embodiment of the invention comprises a computer system for displaying and controlling an interactive graphical user interface, the computer system comprising: at least one memory to store at least one computer program of machine-readable instructions, where the at least one program performs operations to display and control the interactive graphical user interface when executed; a display for displaying the interactive graphical user interface; and at least one processor coupled to the at least one memory and display, wherein the at least one processor performs at least the following operations when the at least one program is executed: displaying a graph having two axes corresponding to first and second variables in the interactive graphical user interface, wherein a two-dimensional region between the two axes specifies values the first and second variables may assume, wherein values that the two variables may assume determines a value of a third variable; displaying a slider control in the two-dimensional region; receiving a command moving the slider control within the two-dimensional region to a new position, wherein the movement of the slider control to a new position determines a new combination of values for the first and second variables; calculating a new value for the third variable based on the new combination of values for the first and second variables; and displaying a graphical component representing the new value for the third variable in the interactive graphical user interface.

In conclusion, the foregoing summary of the embodiments of the present invention is exemplary and non-limiting. For example, one skilled in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
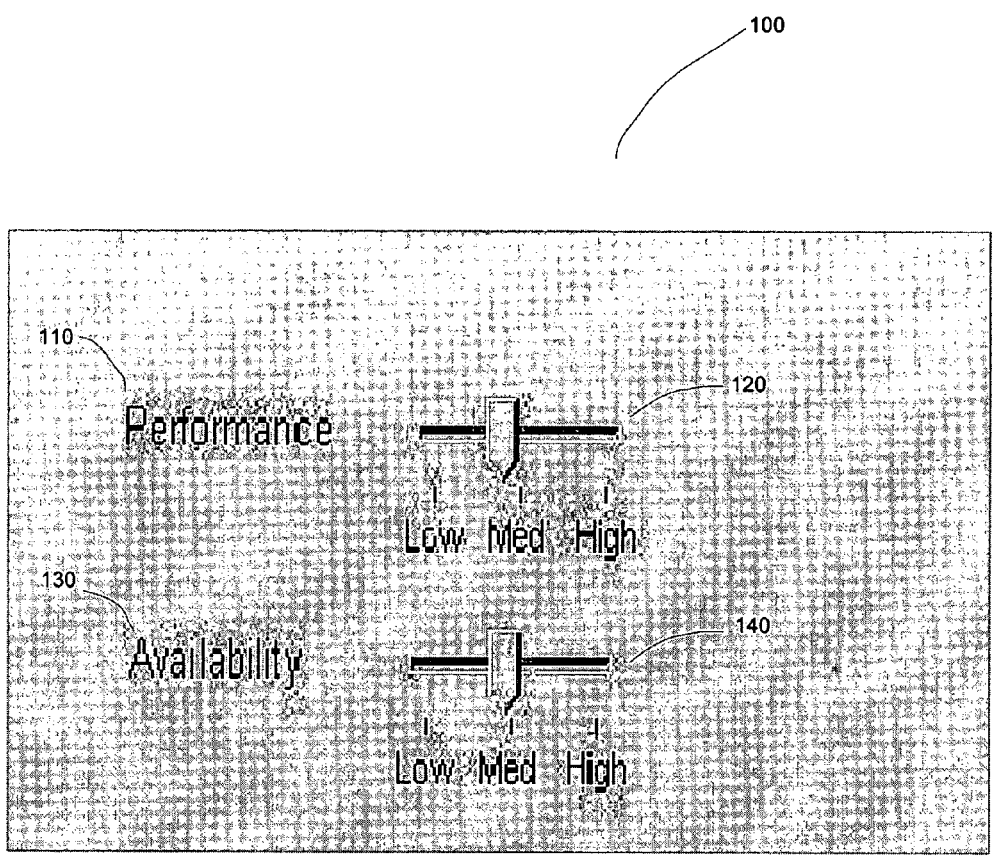
FIG. 1 depicts a two-variable slider control operating in accordance with the prior art.

FIG. 1 depicts a conventional slider control 100 for adjusting values associated with two variables 110, 130. The slider control 100 comprises individual sliders 120, 140 associated with corresponding variables, performance 110 and availability 130. Such a slider control can be used to control the operations of, for example, a computer system. It is difficult to determine exactly how optimal the level of control that is achieved with the slider control 100 depicted in FIG. 100. For example, since no cost variable is displayed, it is not known whether a particular combination of settings for variables performance and availability is optimal from a cost perspective. In addition, since no maintenance variable is displayed, it is not known whether a particular combination of variables results in a low-maintenance or a maintenance-intensive implementation. Accordingly, so while dual slider controls may make it somewhat easier to control a complex process, those skilled in the art desire greater assistance in determining whether suitable, or even optimal, combinations of values for variables have been selected.

Figure 2:
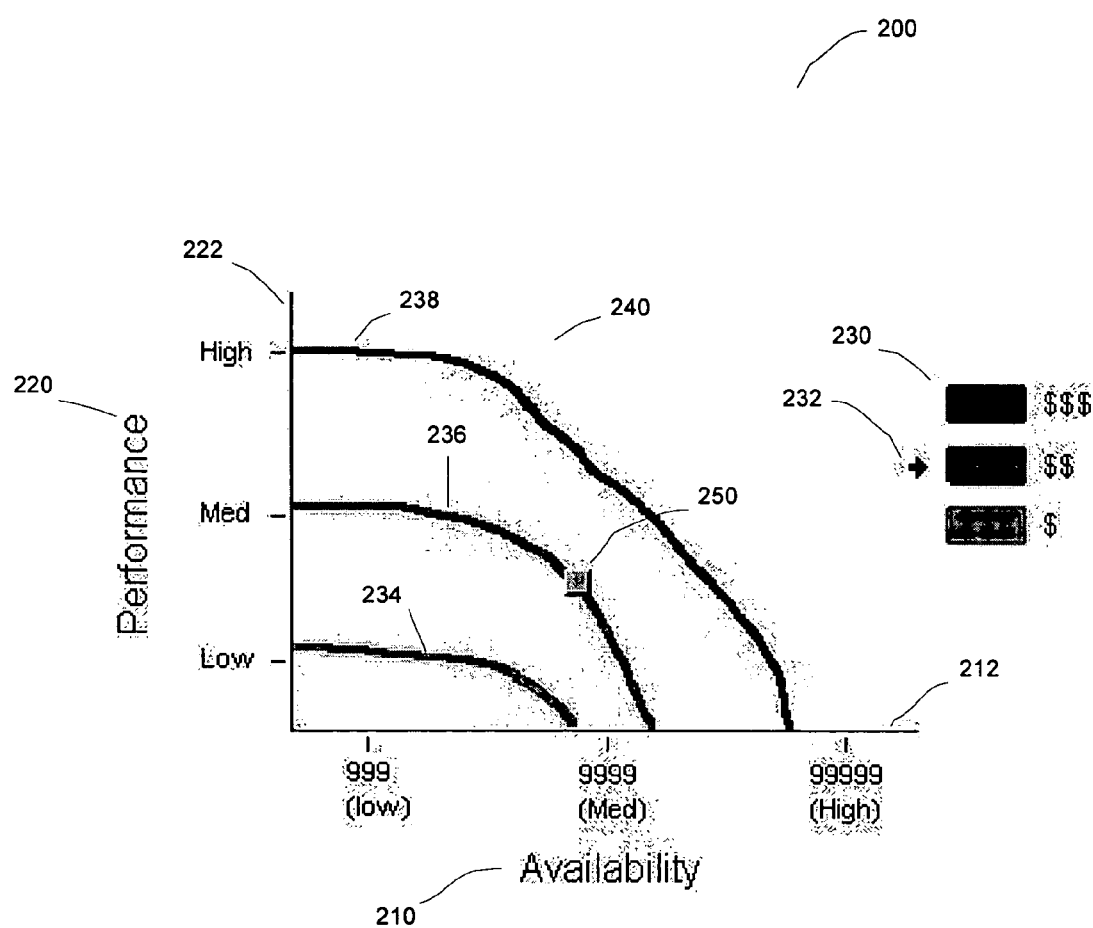
FIG. 2 depicts a two-dimensional slider control operating in accordance with an embodiment of the invention.

FIG. 2 depicts a graphical user interface operating in accordance with the invention that overcomes the limitations of the prior art. In particular, the graphical user interface 200 comprises two axes 212, 222, that correspond to, and are associated with, two variables 210, and 220, respectively. The two axes 212, 222 define a two-dimensional region 240 between the axes. The axes 212, 222 and two-dimensional region 240 graphically depict the respective values that variables 210 and 220 may assume. In contrast to the dual slider control depicted in FIG. 1, the graphical user interface 200 operating in accordance with the present invention further comprises a graphical component 230 corresponding to a third variable. An indicator 232 visually depicts the current value of the third variable as determined by the current combination of values for the first and second variables. The current combination of values for the availability and performance variables is determined by the current position of a slider control 250. As is apparent, instead of separately setting the values of two variables with separate slider controls 120, 140 as in the case of the conventional control 100, in the graphical user interface 200 of the present invention, a single control is used to set values of both variables 210, 220.

An additional advantage is shown in FIG. 2 as well. Curves 234, 236 and 238 correspond to various levels of the third variable as depicted in graphical element 230. For example, curve 238 shown in two-dimensional area 240 corresponds to cost level "$$$" shown in graphical element 230. To explain in greater detail, all combinations of values for variables 210, 200 falling along curve 238 correspond to, and are associated with, a cost level "$$$". In addition, all combinations of values for variables 210, 220 falling along curve 236 correspond to, and are associated with, a cost level "$$" (which is a lower cost level than that associated with line 238, which corresponded to a higher cost level "$$$"). Further, all combinations of values for variables 210, 220 falling along curve 234 correspond to cost level "$" (which is lower than either cost levels "$$" or "$$$" associated with curves 236, 238).

This feature represents a particular advantage of the graphical user interface of the invention. In the conventional dual slider control 100 depicted in FIG. 1, no information is provided regarding the effect of the setting of variables 110, 130 on other variables. Accordingly, a user is not provided with any guidance regarding whether a particular combination of values is, for example, either cost-effective, or within budgetary constraints. In addition, information is provided in the graphical user interface 200 which is not provided to a user of the dual slider control of FIG. 1.

Figure 3:
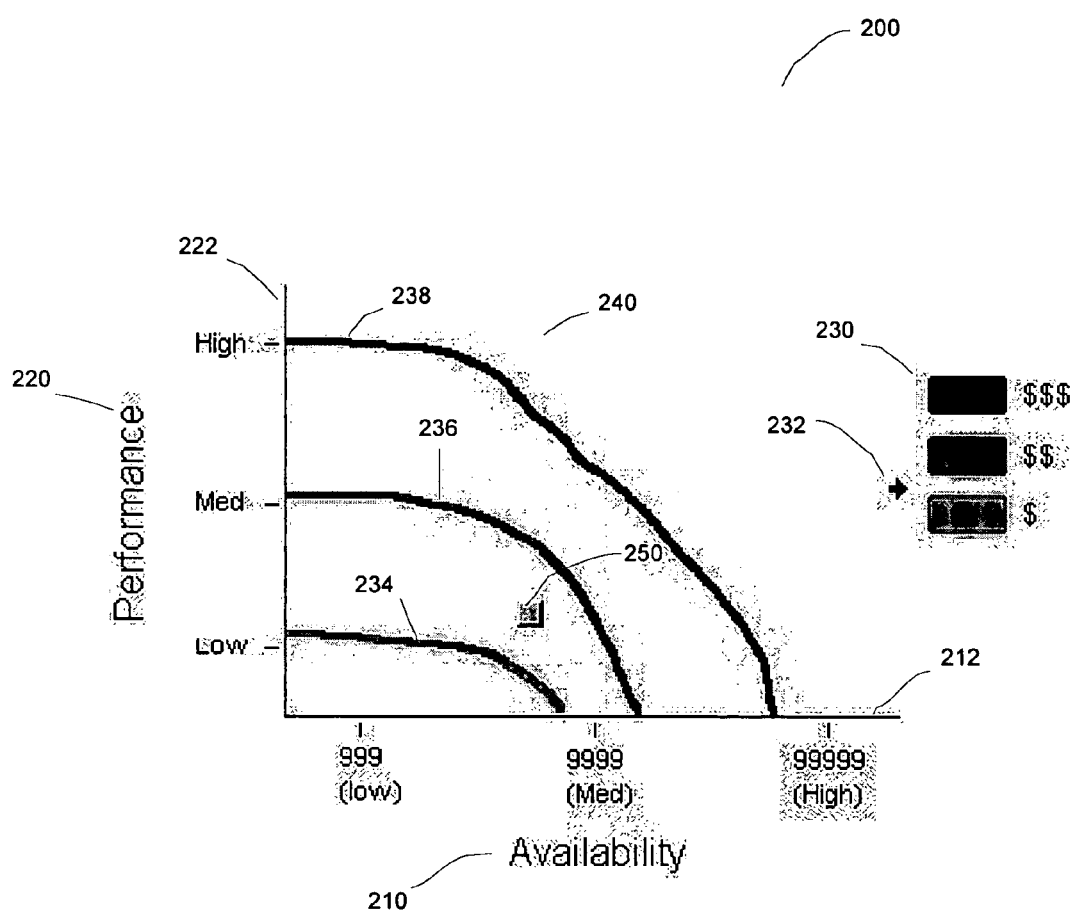
FIG. 3 depicts a two-dimensional slider control operating in accordance with an embodiment of the invention.

As an example, a user starting at an initial point along curve 236 as depicted in FIG. 2 moves the slider control 250 to a new position as shown in FIG. 3. As the slider control 250 moves to the new position depicted in FIG. 3, indicator 232 associated with the third variable moves downward as well, indicating that the new combination of variables 210, 220 associated with the new position of the slider control 250 corresponds to a lower cost option.

Figure 4:
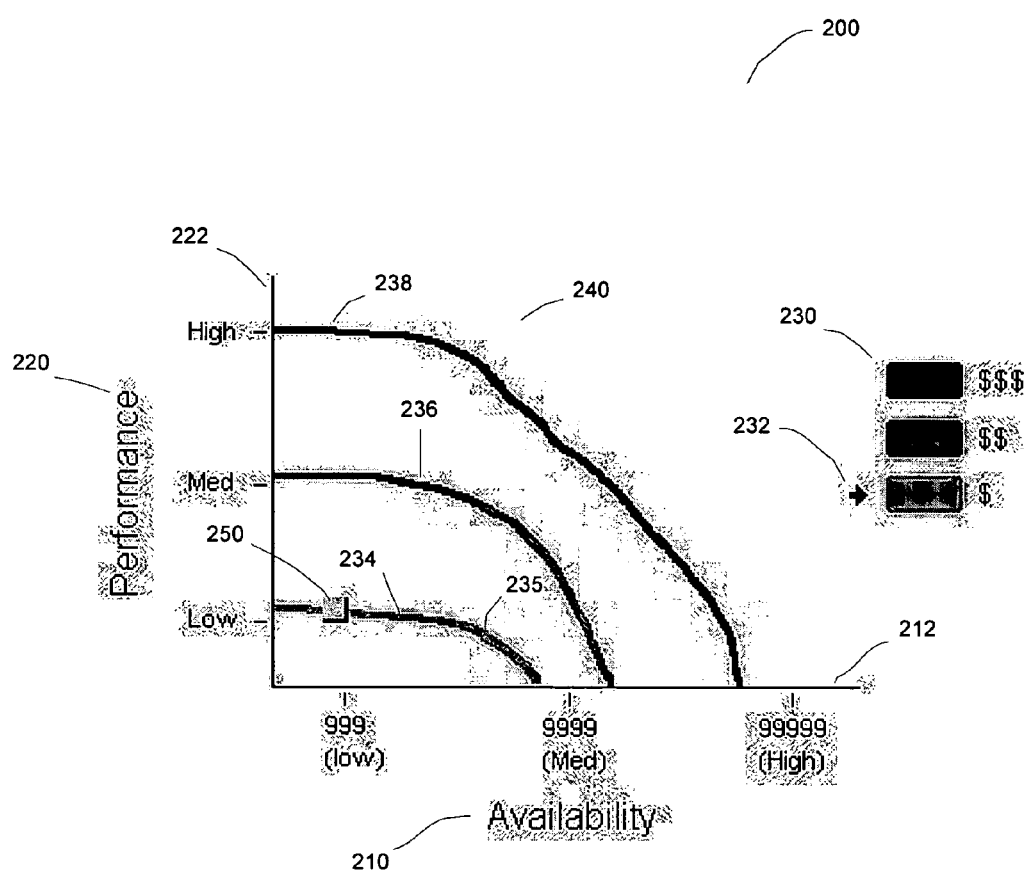
FIG. 4 depicts a two-dimensional slider control operating in accordance with an embodiment of the invention.
Figure 5:
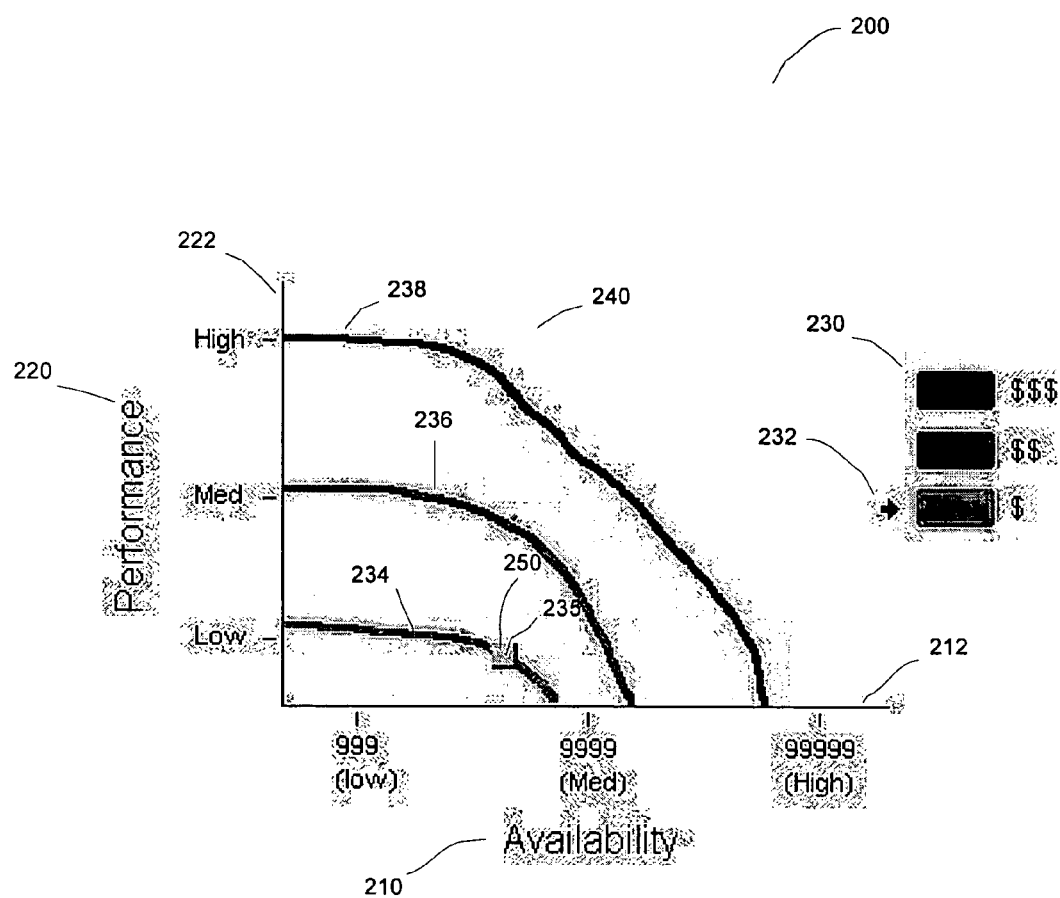
FIG. 5 depicts a two-dimensional slider control operating in accordance with an embodiment of the invention.

Another advantage of the present invention is that a user can select "optimal" points easily, because optimal portions are readily apparent in the curves 234, 236 and 238. A user can see from optimal portions in the curves where further adjustment of one of the variables comes at an increasingly greater cost to the other variable. For example, a user has decided to operate along curve 234 corresponding to a low-cost option "$" as seen in FIGS. 4 and 5. In looking at curve 234, it is evident in moving the slider control 250 from left to right, that increasing levels of "availability" can be had for relatively low cost in "performance", up through optimal portion 234a. Beyond optimal portion 234a further levels of availability come at an ever-increasing cost to performance, until the value of the performance variable bottoms out. Accordingly, in most instances it would make sense to select an operating point (e.g., 235) in optimal portion 234a, because point 235 represents a near-optimal combination of performance and availability for a given cost, when performance is valued more highly than availability.

Figure 6:
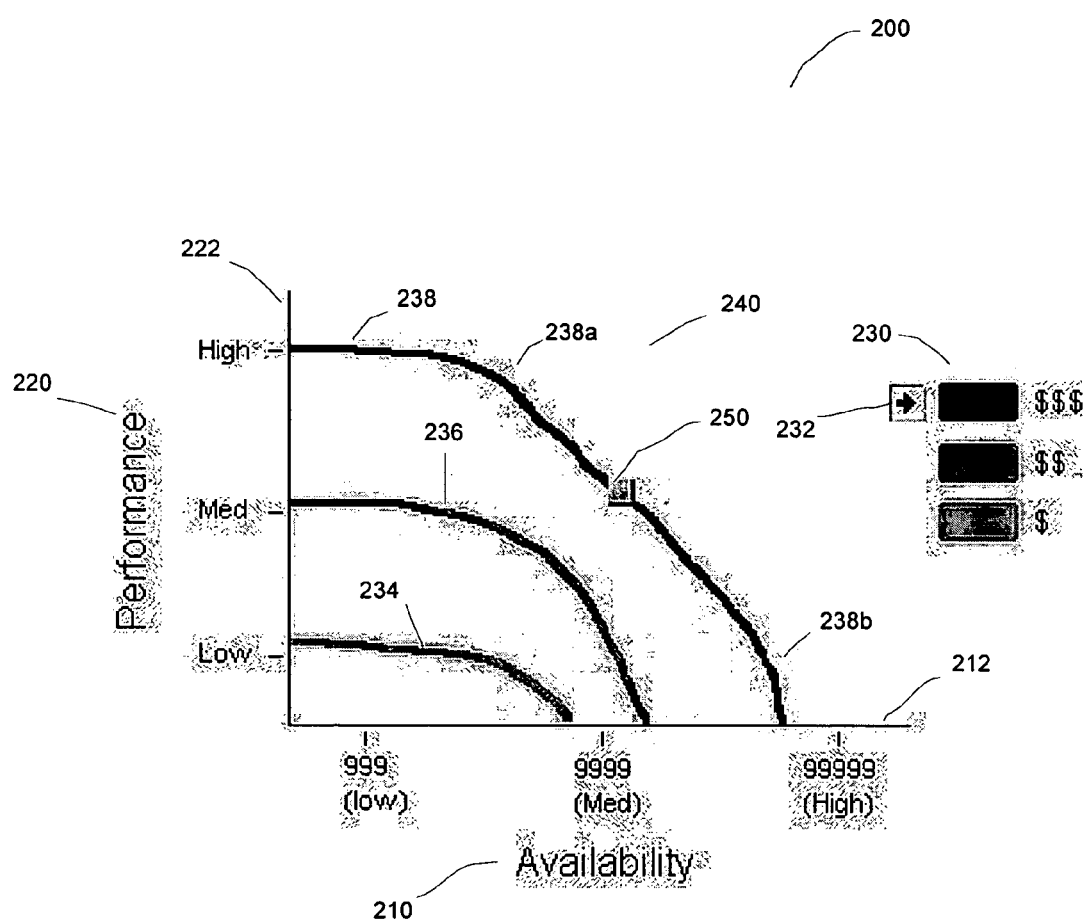
FIG. 6 depicts a two-dimensional slider control operating in accordance with an embodiment of the invention.
Figure 7:
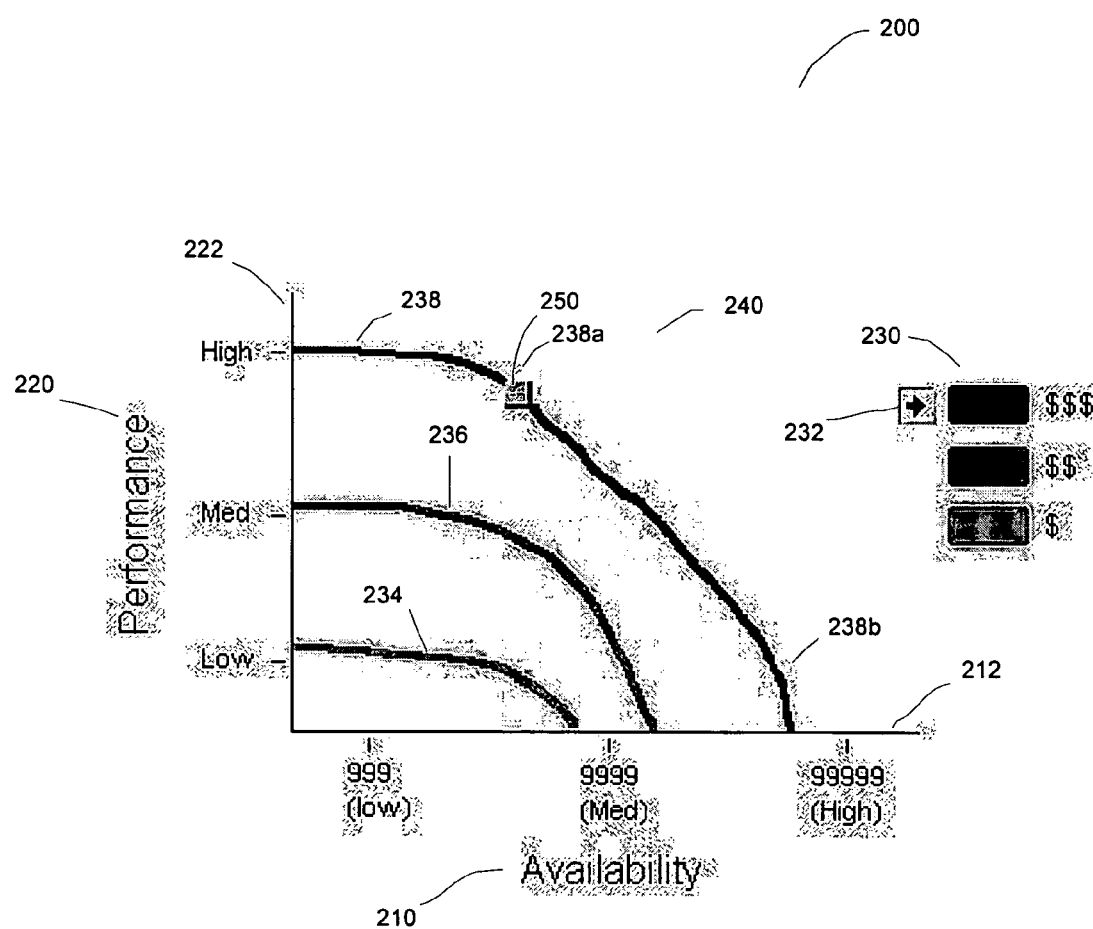
FIG. 7 depicts a two-dimensional slider control operating in accordance with an embodiment of the invention.
Figure 8:
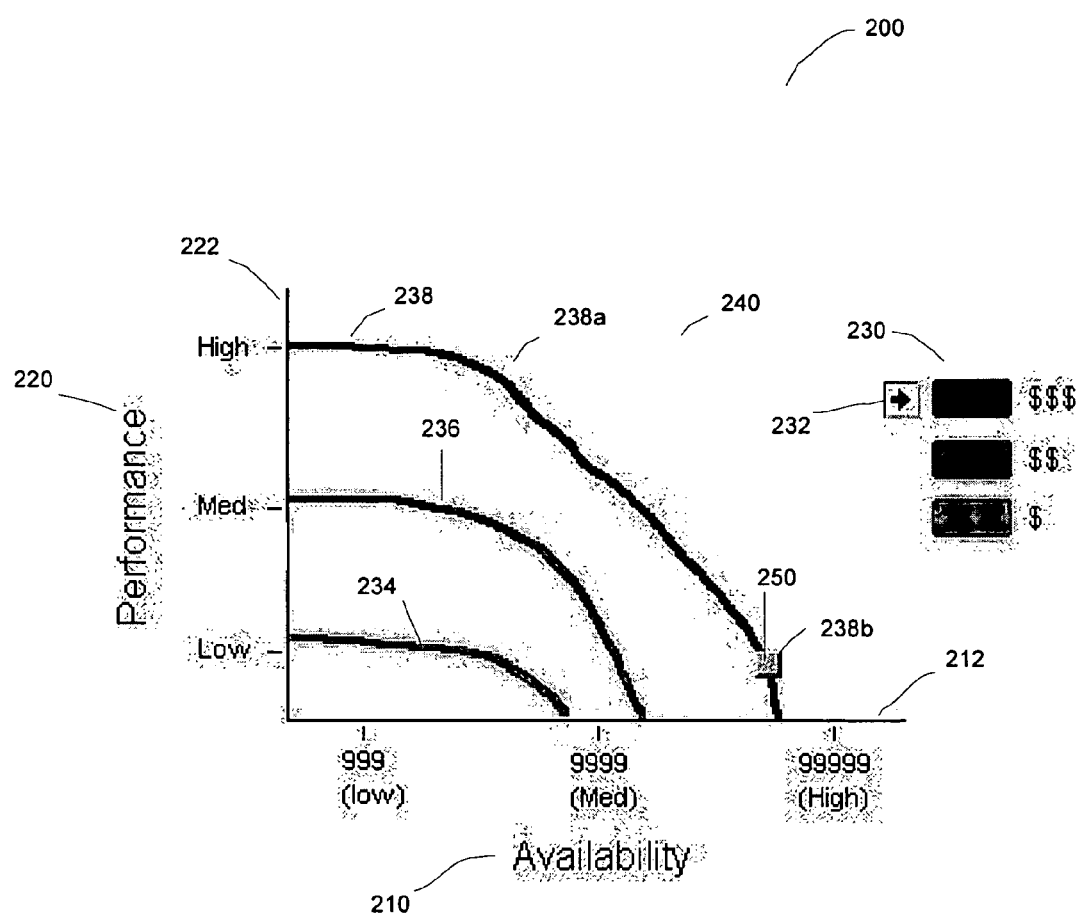
FIG. 8 depicts a two-dimensional slider control operating in accordance with an embodiment of the invention.

In contrast, curve 238 corresponding to high cost "$$$" has two optimal portions 238a and 238b. These help a user of the graphical user interface 200 of the invention to select a combination of values for variables availability and performance 210, 200, respectively, as shown in FIGS. 6-8. For example, if a user can accept cost level "$$$" (it fits within budgetary constraints) then the user will make a determination about what variable is most important. For example, if performance and availability are equally important, the user will select a point about midway along curve 238, which roughly corresponds to medium levels of performance and availability, as shown in FIG. 6. Alternatively, if a relatively high level of performance is desired, the user will examine the portion of the curve 238 closer to the performance axis 222. As is apparent, initially higher levels of availability can be had for relatively little cost to performance. After optimal portion 238a, though, improvements in availability come at an increasingly higher cost to performance. Accordingly, a user interested mainly in performance would be expected to select a combination of values for variables 210, 220 in optimal portion 238a (e.g., 239a), as shown in FIG. 7.

Alternatively, if one using the graphical user interface of the invention is interested in high levels of availability, but performance is relatively less important, than the user would be interested in the portion along curve 238 near the availability axis 212. As can be seen, as one moves along curve 238 away from axis 212, initially additional performance can be had for relatively little cost in availability up until optimal portion 238b. Beyond optimal portion 238b, the cost in availability of higher levels of performance becomes much greater. Accordingly, a user mainly interested in availability and not so interested in performance would pick an operating point in optimal portion 238b (e.g., 239b), as shown in FIG. 8.

Figure 9:
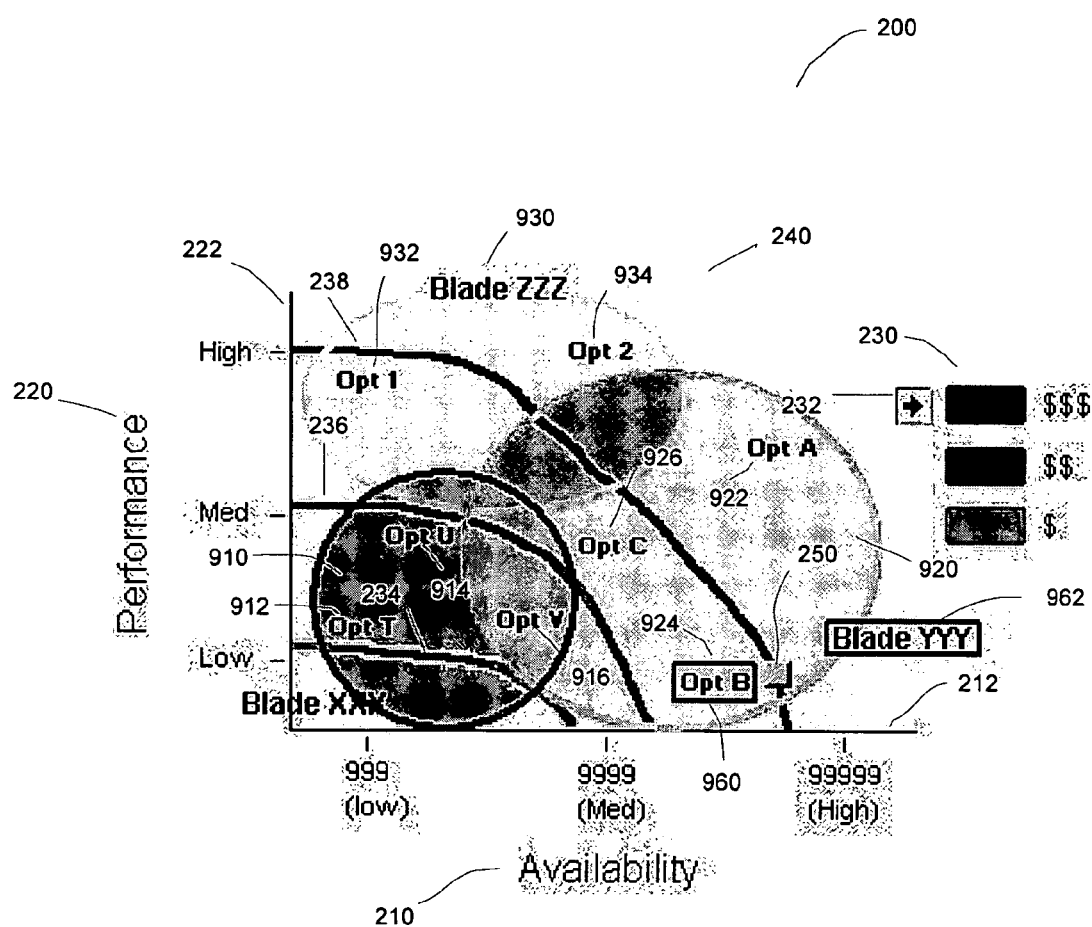
FIG. 9 depicts a two-dimensional slider control with additional information superimposed in a region of the two-dimensional slider control, all operating in accordance with another embodiment of the invention.
Figure 10:
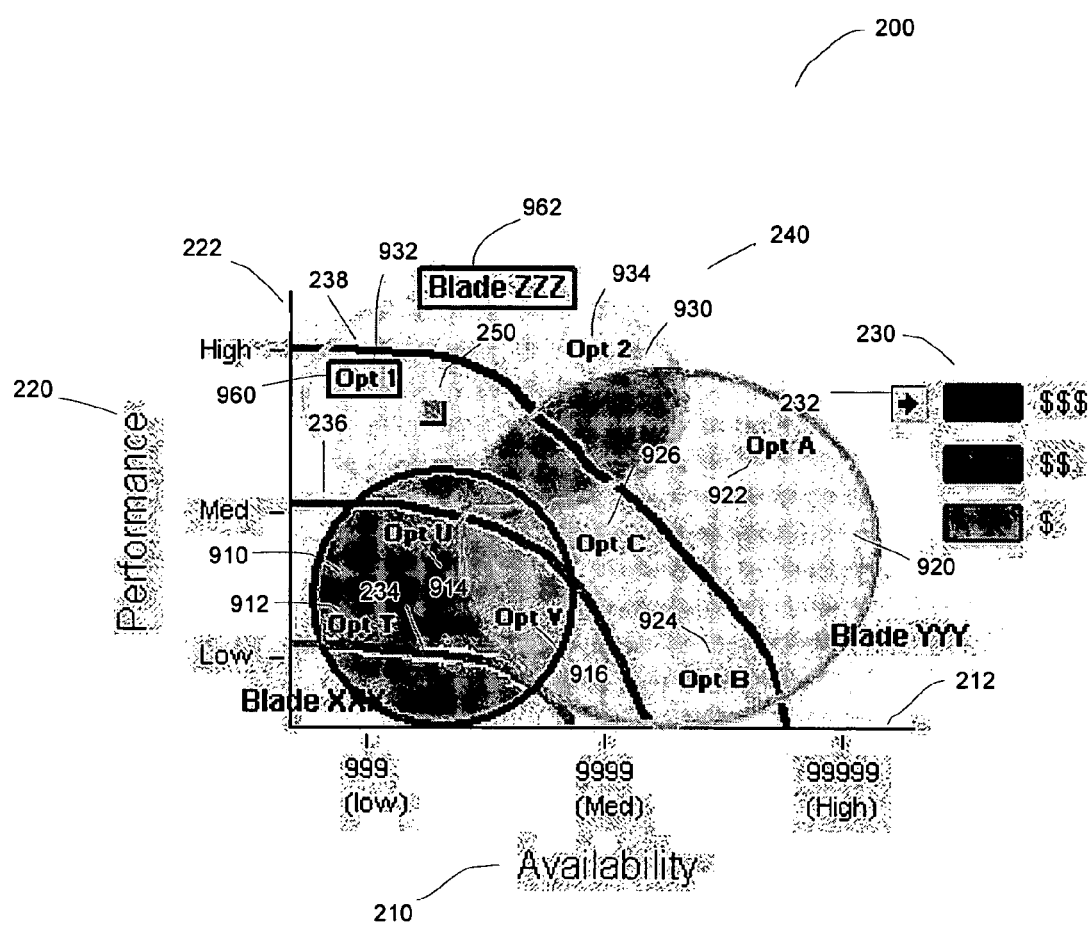
FIG. 10 depicts a two-dimensional slider control with additional information superimposed in a region of the two-dimensional slider control, all operating in accordance with another embodiment of the invention.

FIGS. 9-10 display another embodiment of the invention. In this embodiment, it is assumed that a user is relatively constrained in the options that may be chosen. For example, assume that a user is using the invention to select a server configuration, and that there are several pre-existing server configurations available based on particular server models. Region 910 corresponds to a configuration using Blade XXX. There are several pre-existing options based on Blade XXX corresponding to Option T as shown by reference character 912; Option U as shown by reference character 914; and Option V as shown by reference character 916. Region 920 corresponds to configurations using Blade YYY. There are several pre-existing options based on Blade YYY corresponding to Option A as shown by reference character 922; Option B as shown by reference character 924; and Option C as shown by reference character 926. There are several pre-existing options based on Blade ZZZ corresponding to Option 1 as shown by reference 932 and Option 2 as shown by reference character 934. In this example, regions 910, 920 and 930 are provided as an aid to a user to show the general range of options available.

In operation, this embodiment of the invention functions as follows. A user moves slider control 250 about two-dimensional region 930. Slider control does not actually determine the combination of values for the performance and availability variables 210,220. Rather, depending on the movement of slider control, box 960 snaps to the option likely to be selected by the user next. The snapping can be done based on underlying detents within the two-dimensional area, which can be point-based, line-based, or area-based detents. For example, if the user is moving the slider control toward Option B, the methods of the present invention will detect this intention based on analysis of the trajectory of slider control 250, and will snap selection box 960 to Option B. Alternatively, methods of the present invention can snap the selection box 960 to options adjacent to the slider control. The end result of the operation is shown in FIG. 9. In addition, box 962 acts in synchronism with selection box 960 to indicate which Blade the currently selected option is associated with. Indicator 232 will then graphically indicate the value of variable 230 corresponding to the combination of values for the variables availability 210 and performance 220 associated with Option B 924.

Further operation of this embodiment of the invention is depicted in FIG. 10. As is apparent, a user has moved the slider control nearly to the position of Option 1. As a result, the selection box 960 has snapped to Option 1, and box 962 has snapped to Blade ZZZ. Since Option 1 represents a high cost option, indicator 230 remains at a position similar to that depicted in FIG. 9.

In alternative embodiments of the invention, combinations of values falling within regions 910, 920 and 930 associated with options Blade XXX, Blade YYY and Blade ZZZ are also available for selection, in addition to the discrete options corresponding to reference characters 912, 914, 916, 922, 924, 926, 932 and 934. In such an embodiment, a user may toggle a control that disables the operation of selection box 960 which is snapped to discrete options. Instead, the user would use slider control 250 to select combinations of values for the availability and performance variables 210, 220. In this particular embodiment, though, the movement of slider control 250 could be restricted to movement within regions 910, 920 and 930.

Figure 11:
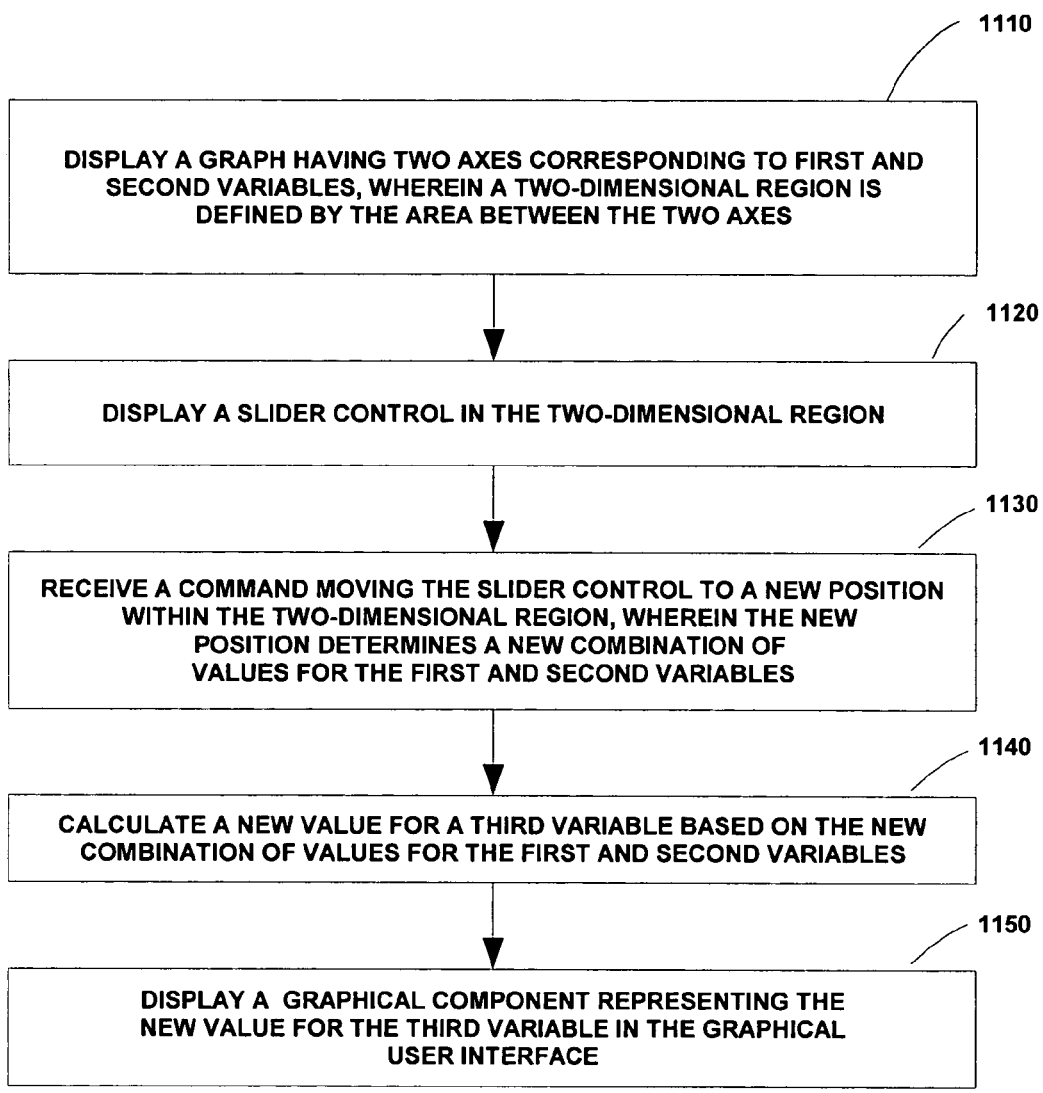
FIG. 11 depicts a method operating in accordance with the invention.

FIG. 11 is a flowchart depicting a method operating in accordance with the invention, which will be described with reference to the preceding figures. The method begins at step 1110, where a computer programmed to operate in accordance with the methods of the invention displays a graph having two axes 212, 222 corresponding to first and second variables 210, 220, wherein a two-dimensional region 240 is defined by the area between the two axes 212, 222. Next, at step 1120, the computer displays a slider control 250 in the two-dimensional region. Then, at step 1130, the computer receives a command moving the slider control 250 to a new position within the two-dimensional region, wherein the new position determines a new combination of values for the first and second variables 210, 220. Next, at step 1140, the computer calculates a new value for a third variable based on the new combination of values for the first and second variables. Then, at step 1150, the computer displays a graphical component representing the new value for the third variable in the interactive graphical user interface.

In one variant of the method depicted in FIG. 11, an additional step is performed. In the additional step, curves 234, 236 and 238 are displayed in the two-dimensional region 240. Although three curves 234, 236 and 238 are displayed in FIGS. 2-6, this is not essential; one or more curves may be displayed in this variant of the invention. Curves 234, 236 and 238 correspond to constant values for the third variable. As is apparent, curve 234 corresponds to a low-cost option ($); curve 236 corresponds to a mid-cost option ($$); and curve 238 corresponds to a high-cost option ($$$). Curves 234, 236 and 238 help a user to select more easily a combination of values for variables 210, 220 since the curves indicate where certain values for the third variable fall within the two-dimensional region. If a user desires a relatively low-cost option, then the user would know to immediately move the slider control to a region close to the origin of the two axes 212, 222 because of the cue provided by curve 234. Alternatively, if the user can accept a relatively high-cost option (e.g., cost of service), then the user would know to immediately move the slider control 250 to a region relatively distant from the origin of the axes due to the cue provided by curve 238.

In another variant of the method depicted in FIG. 11 additional steps are performed. In a first step, a computer executing a computer program performing methods in accordance with the invention receives a command to switch one of the first and second variables with the third variable. Thereafter, values the third variable may assume are displayed on one of the axes. A user selects the value of the third variable and a value for the one of the first and second variables not switched with the third variable using the slider control. A combination of values selected for the one of the first and second variables not switched with the third variable and the third variable determine a value for the one of the first and second variables switched with the third variable. Then, the computer receives a command moving the slider control within the two-dimensional region to a new position, wherein the movement of the slider control to a new position determines a new combination of values for the third variable and the one of the first and second variables not switched with the third variable. Next, the computer calculates a new value for the one of the first and second variables switched with the third variable. Then, the computer displays the new value for the one of the first and second variables switched with the third variable in the interactive graphical user interface using a graphical component. In an example of this embodiment, in FIG. 2, "availability" 210, values of which are currently shown on axis 212, would switch positions with "cost", values of which are currently shown by graphical element 230 and indicator 232. After the switch, values for "cost" available for selection would be shown on axis 212, and a user would simultaneously select values for "performance" and "cost" with slider control 250. Values selected for "performance" and "cost" would then be used to determine a value for "availability", the current value of which would be shown using a graphical element similar to 230.

In a further variant of the method depicted in FIG. 11, in addition to third variable "cost", values of one or more additional variables may be shown using graphical components like 230, 232. Current values of such additional variables would each be determined by the current values of the first and second variables set with slider control 250. Any of these additional variables may be switched with one of the first and second variables in a manner similar to that described in the immediately preceding variant.

In yet another variant of the method depicted in FIG. 11, the method is used to control a process such as, for example, a manufacturing process; a security process; or a computer-related process. In these variants, the third variable (the current value of which is shown with elements 230, 232) may alternatively be cost or maintenance.

Figure 12:
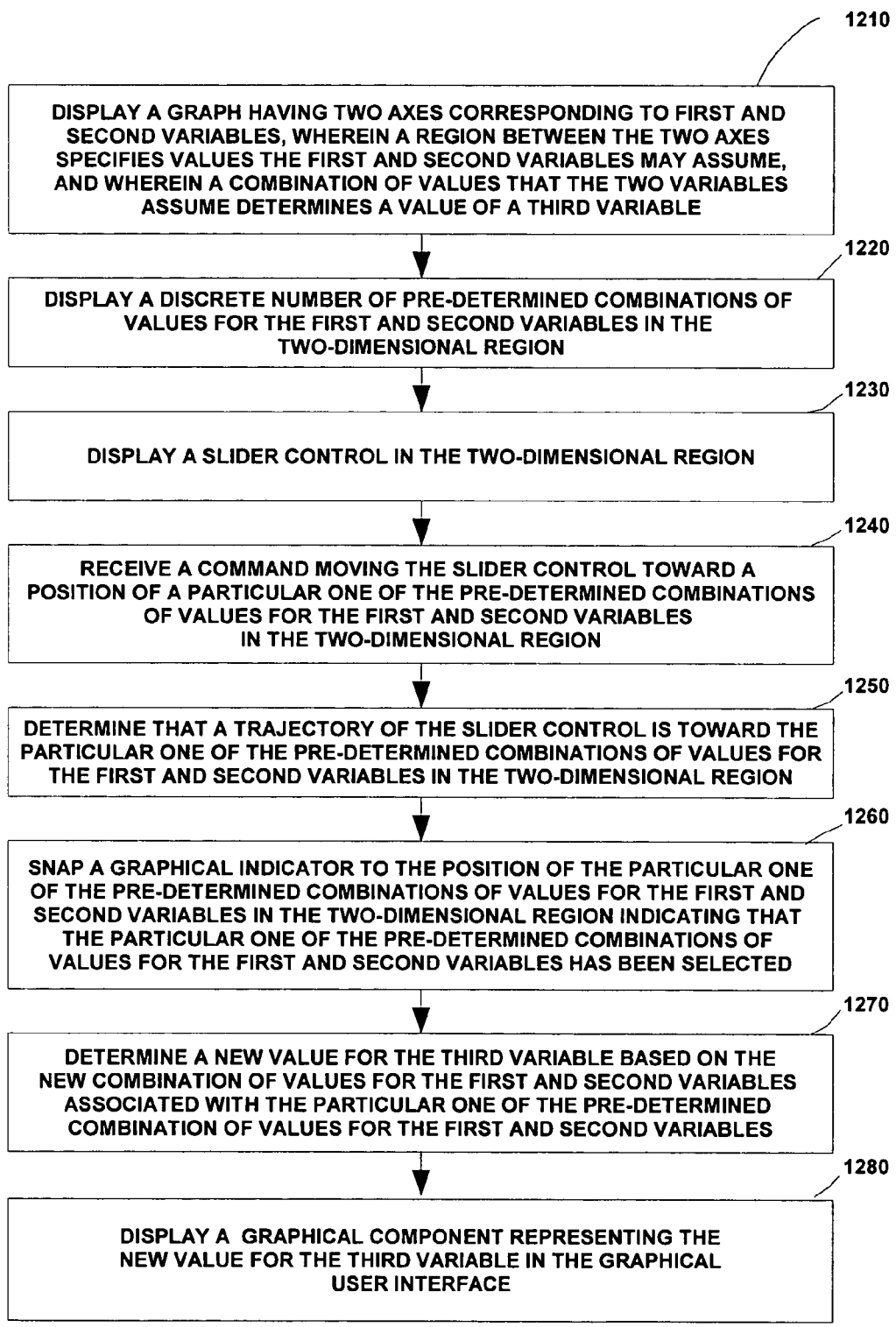
FIG. 12 depicts another method operating in accordance with the invention.

FIG. 12 is a flowchart depicting another method operating in accordance with the invention. The method depicted in FIG. 12 will be described with reference to the preceding figures. The method begins at step 1210, where a computer programmed to operate in accordance with the methods of the invention displays a graph having two axes 212, 222 corresponding to first and second variables 210, 220, wherein a region 240 between the two axes specifies values that the first and second variables may assume, and wherein values that the two variables assume determine values of a third variable. Then, at step 1220 a discrete number of pre-determined combinations of values of for the first and second variables (912, 914, 916, 922, 924, 926, 932 and 934) are displayed in the two-dimensional region. Next, at step 1230, a slider control 250 is displayed in the two-dimensional region 240. Then, at step 1240, the computer receives a command moving the slider control 250 toward a position of a particular one 932 of the pre-determined combinations of values for the first and second variables in the two-dimensional region. Next, at step 1250, the computer determines that a trajectory of the slider control 250 is toward the particular one of the predetermined combinations of values for the first and second variables in the two-dimensional region. Then, at step 1260, the computer snaps a graphical indicator to the position of the particular one of the pre-determined combinations of values for the first and second variables in the two-dimensional region, thereby indicating that the particular one of the pre-determined combinations of values for the first and second variables has been selected. Next at step 1270, the computer determines a new value for the third variable based on the new combination of values for the first and second variables associated with the particular one of the pre-determined combination of values for the first and second variables. Then, at step 1280, the computer displays a graphical component representing the new value for the third variable in the interactive graphical user interface.

In a variant of the method depicted in FIG. 12 additional steps are performed. First, the computer receives a command to change to a new mode of operation, wherein when in the new mode of operation a user enters a command switching the third variable with one of the first and second variables. When switched, operations are performed displaying values the third variable may assume on one of the axes. The user then selects a value of the third variable and a value of the one of the first and second variables not switched with the third variable using the slider control. A combination of values selected for the one of the first and second variables not switched with the third variable and the third variable using the slider control determines a value for the one of the first and second variables switched with the third variable. After receiving a command to change to the new mode of operation, the computer then receives a command to switch one of the first and second variables with the third variable. Next, the computer performs operations to display values the third variable may assume on an axis previously occupied by the one of the first and second variables switched with the third variable. Then, the computer receives a command moving the slider control within the two-dimensional region to a new position, wherein the movement of the slider control to a new position determines a new combination of values for the third variable and the one of the first and second variables not switched with the third variable. Next, the computer calculates a new value for the one of the first and second variables switched with the third variable. Then, the computer displays a graphical component representing the new value for the one of the first and second variables switched with the third variable in the interactive graphical user interface.

As used herein "user" may refer to a person or an automated process.

Figure 13:
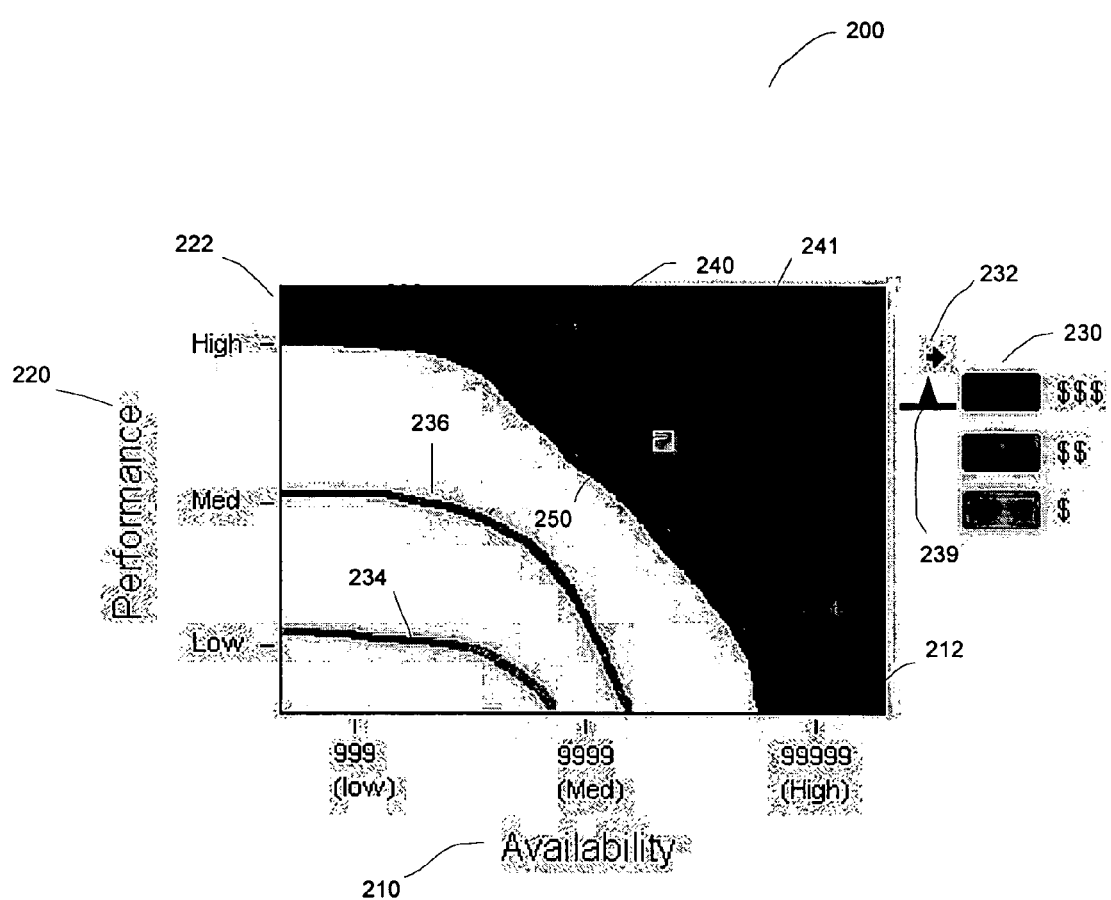
FIG. 13 depicts a two-dimensional slider control operating in accordance with a further embodiment of the invention.

FIG. 13 depicts a further embodiment of the invention. In the embodiment depicted in FIG. 13 a user has selected a control mode where movement of the slider control is restricted to a region corresponding to a particular value, or ranges of values, of the third variable. The user has selected the particular values for the third variable with control 239. Control 239 indicates that only combinations of values for the first and second variables which result in a value for the third variable corresponding to at least a high-cost option ($$$) may be selected. The region 241 corresponding to the combinations of values for the first and second variables that may be selected is graphically set apart by shading. When the slider control is moved, it is restricted to region 241.

One of ordinary skill in the art will understand that the methods depicted and described herein can be embodied in a tangible machine-readable memory medium. A computer program fixed in a machine-readable memory medium and embodying a method or methods of the present invention perform steps of the method or methods when executed by a digital processing apparatus coupled to the machine-readable memory medium. Tangible machine-readable memory media include, but are not limited to, hard drives, CD- or DVD-ROM, flash memory storage devices or in a RAM memory of a computer system. A machine-readable memory medium tangibly embodying such a computer program comprises an embodiment of the present invention.

Thus it is seen that the foregoing description has provided by way of exemplary and non-limiting examples a full and informative description of the best methods and apparatus presently contemplated by the inventors for implementing a slider control movable in a two-dimensional region for simultaneously adjusting values of multiple variables. One skilled in the art will appreciate that the various embodiments described herein can be practiced individually; in combination with one or more other embodiments described herein; or in combination with interactive graphical user interfaces differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A computer memory medium tangibly embodying a program of machine-readable instructions executable by a digital processing apparatus of a computer system to perform operations for displaying and controlling an interactive graphical user interface, the operations comprising:

displaying a graph having two axes corresponding to first and second variables in the interactive graphical user interface, wherein a two-dimensional region between the two axes specifies values the first and second variables may assume, wherein a combination of values that the two variables assume determines a value of a third variable, wherein the combination of values that the first and second variables assume further determines a value of a fourth variable, wherein predetermined combinations of values exist for the first and second variables, wherein the predetermined combinations of values for the first and second variables correspond to discrete points within the two-dimensional region between the two axes;

displaying a slider control in the two-dimensional region;

prior to receiving a command moving the slider control, displaying the predetermined combinations of values for the first and second variables in the two-dimensional region between the two axes;

receiving a command moving the slider control within the two-dimensional region to a new position, wherein the movement of the slider control to a new position determines a new combination of values for the first and second variables, wherein the two-dimensional region between the two axes comprises a first two-dimensional region and wherein the predetermined combinations of values for the first and second variables define a second two-dimensional region within the first two-dimensional region;

as commands are received moving the slider control within the first two-dimensional region, restricting the movement of the slider control to within the second two-dimensional region associated with the predetermined combinations of values for the first and second variables;

as commands are received moving the slider control within the first two-dimensional region, serially snapping a selection box to discrete points within the two-dimensional region associated with the predetermined combinations of values for the first and second variables, wherein the snapping is determined based on a trajectory defined by movement of the slider control, and wherein the selection box indicates that a particular combination from the predetermined combinations of values for the first and second variables has been selected;

calculating new values for the third and fourth variables based on the new combination of values for the first and second variables;

displaying graphical components representing the new values for the third and fourth variables in the interactive graphical user interface;

receiving a command to change to a new mode of control, wherein when in the new mode of control a user may select a value for the third variable, and operations restrict movement of the slider control to movement within a third two-dimensional region within the first two-dimensional region, wherein the third two-dimensional region corresponds to combinations of values of the first and second variables capable of achieving the value selected for the third variable;

receiving a selected value for the third variable;

determining combinations of values of the first and second variables capable of achieving the value for the third value; and graphically depicting the combinations of values capable of achieving the selected value for the third variable in the two-dimensional region between the two axes.

2. The computer memory medium of claim 1 wherein the operations further comprise:
graphically distinguishing the second two-dimensional region from a portion of the first two-dimensional region not encompassed by the second two-dimensional region.

3. The computer memory medium of claim 1 wherein the operations further comprise:
displaying in the two-dimensional region a curve corresponding to a constant value for the third variable, wherein combinations of values of the first and second variables falling along the curve determine a value for the third variable corresponding to the constant value.

4. The computer memory medium of claim 3 wherein the constant value further corresponds to a continuous range of values for the third variable, and wherein the curve further comprises a band.

5. The computer memory medium of claim 1 wherein the operations further comprise:
snapping the slider control to a position within the second two-dimensional region defined by the combination of values for the first and second variables capable of achieving the selected value for the third variable prior to receiving commands moving the slider control; and
receiving commands moving the slider control.

6. The computer memory medium of claim 5 wherein the operations further comprise:
as commands are received moving the slider control, graphically restricting movement of the slider control to the second two-dimensional region defined by the combination of values for the first and second variables capable of achieving the selected value for the third variable.

7. The computer memory medium of claim 1 wherein a combination of values that the first and second variables assume determine values for a plurality of additional variables, wherein calculating new values for the third and fourth variables further comprises calculating new values for the plurality of additional variables; and wherein displaying a graphical component representing the new values for the third and fourth variables further comprises displaying a plurality of graphical components representing the new values for the plurality of additional variables in the interactive graphical user interface.

8. The computer memory medium of claim 1 wherein the graph comprises a graphical control, wherein the graphical control and interactive graphical user interface are used to select operating parameters for a process.

9. The computer memory medium of claim 1 wherein the third variable is a cost variable.

10. The computer memory medium of claim 1 wherein the third variable is a maintenance variable.

11. A method for displaying and controlling an interactive graphical user interface, the method comprising:
displaying a graph having two axes corresponding to first and second variables in the interactive graphical user interface, wherein a two-dimensional region between the two axes specifies values the first and second variables may assume, wherein a combination of values that the first and second variables assume determines a value of a third variable, wherein the graph comprises a graphical control, and wherein the graphical control and interactive graphical user interface are used to select operating parameters for a computer-related process;
displaying a discrete number of pre-determined combinations of values for the first and second variables in the two-dimensional region;
displaying a slider control in the two-dimensional region;
receiving a command moving the slider control toward a position of a particular one of the pre-determined combinations of values for the first and second variables in the two-dimensional region;
determining that a trajectory of the slider control is toward the particular one of the pre-determined combinations of values for the first and second variables displayed in the two-dimensional region;
snapping a graphical indicator to the position of the particular one of the pre-determined combinations of values for the first and second variables in the two-dimensional region indicating that the particular one of the pre-determined combinations of values for the first and second variables has been selected;
determining a new value for the third variable based on the new combination of values for the first and second variables associated with the particular one of the pre-determined combinations of values for the first and second variable;
displaying a graphical component representing the new value of the third variable in the interactive graphical user interface; and
displaying in the two-dimensional region a plurality of curves, wherein each of the curves corresponds to a different value of the third variable.

12. The method of claim 11 further comprising:
receiving a command to change to a new mode of operation, wherein when in the new mode of operation a user enters a command switching the third variable with one of the first and second variables, wherein when switched, operations display values the third variable may assume on one of the axes, and the user selects the value of the third variable and a value of the one of the first and second variables not switched with the third variable using the slider control, and wherein a combination of values selected for the one of the first and second variables not switched with the third variable and the third variable using the slider control determines a value for the one of the first and second variables switched with the third variable;
receiving a command to switch one of the first and second variables with the third variable;
displaying values that the third variable may assume on an axis previously displaying values for the one of the first and second variables switched with the third variable;
receiving a command moving the slider control within the two-dimensional region to a new position, wherein the movement of the slider control to a new position determines a new combination of values for the third variable and the one of the first and second variables not switched with the third variable;
calculating a new value for the one of the first and second variables switched with the third variable; and
displaying a graphical component representing the new value for the one of the first and second variables switched with the third variable in the interactive graphical user interface.

* * * * *